Feb. 9, 1937.   J. F. WALLACE   2,069,791
SHOCK ABSORBER
Original Filed Nov. 2, 1933   2 Sheets-Sheet 2
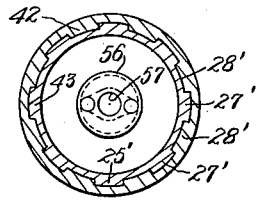
FIG. 4
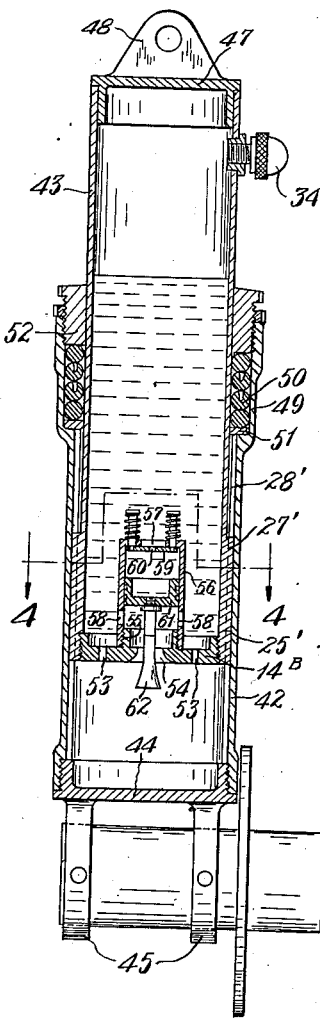
FIG. 3
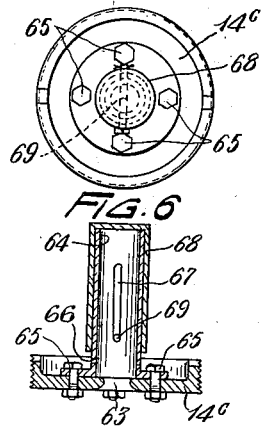
FIG. 6
FIG. 5
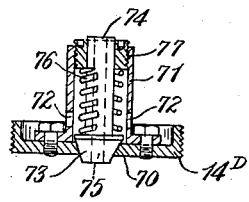
FIG. 7
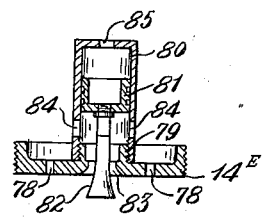
FIG. 8
INVENTOR.
JOHN F. WALLACE
BY Kwis Hudson & Kent
ATTORNEY.

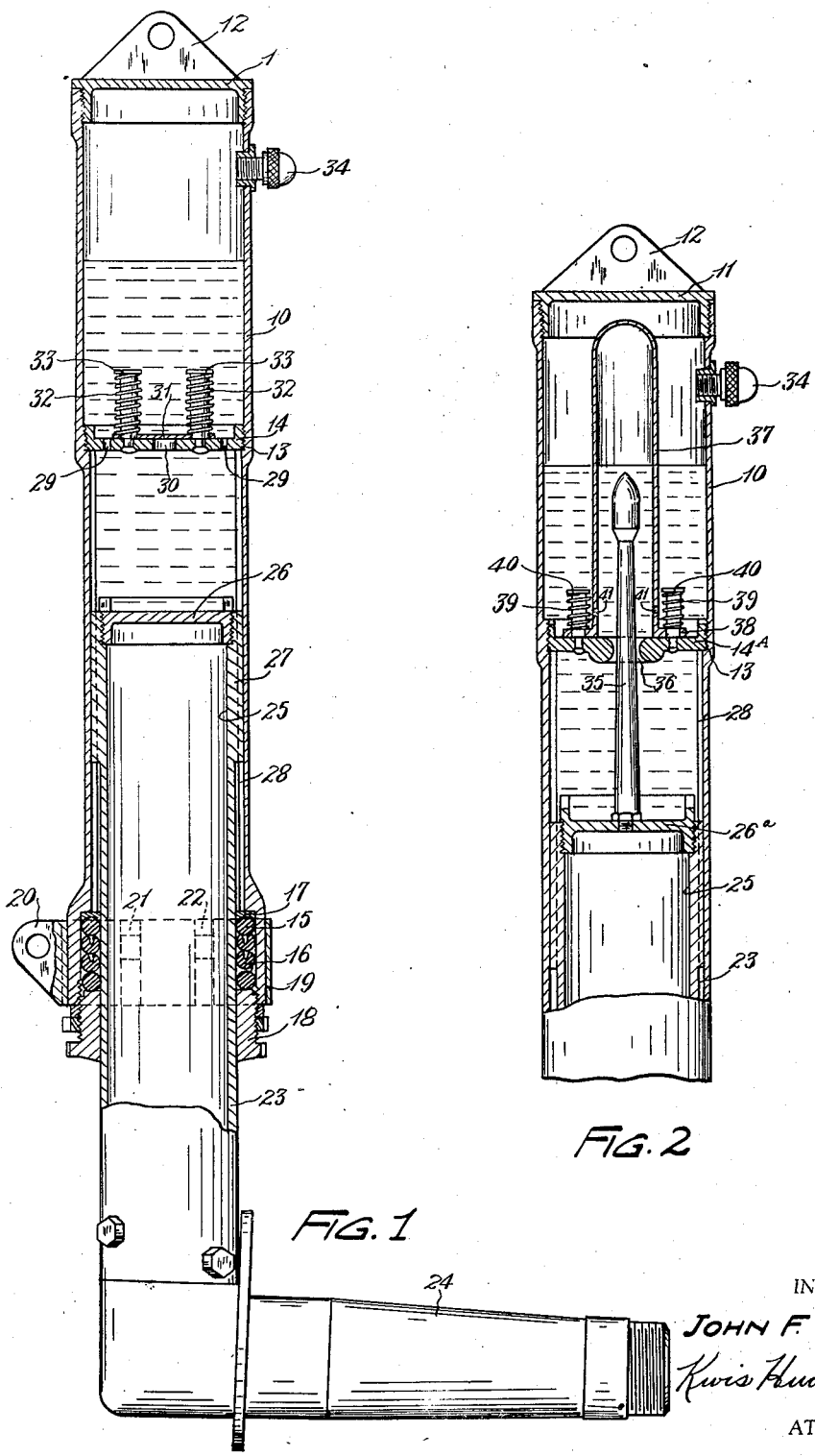

Patented Feb. 9, 1937

2,069,791

UNITED STATES PATENT OFFICE 2,069,791

SHOCK ABSORBER

John F. Wallace, Cleveland, Ohio, assignor to The Cleveland Pneumatic Tool Company, Cleveland, Ohio, a corporation of Ohio Original application November 2, 1933, Serial No. 696,408. Divided and this application September 6, 1934, Serial No. 742,955. Renewed May 8, 1936

5 Claims. (Cl. 267—64)

This invention relates to improvements in resilient struts, that is to say, shock absorbing struts. Primarily it is designed for use upon airplanes to cushion the impact of landing and to absorb the shocks of taxying.

The present application is a division of my co-pending application Serial Number 696,408, filed November 2, 1933.

One of the objects of the invention is the provision of novel means for regulating the flow of liquid through metering openings in such a manner as to automatically adjust the rate of flow to the load at any given instant, thereby making the operation of the device sufficiently flexible to fit all conditions in a highly satisfactory manner.

Another object is the provision of novel valve means for varying the rate of flow of liquid through a piston or other partition employed in hydraulic shock absorbers.

Other objects and features of novelty will appear as I proceed with the description of those embodiments of the invention which, for the purposes of the present application, I have illustrated in the accompanying drawings, in which Fig. 1 is an elevational view, partly in central vertical section, of an airplane strut.

Fig. 2 is a fragmentary central vertical sectional view illustrating a strut embodying a modified form of valve.

Fig. 3 is a view similar to Fig. 1, of a further modification.

Fig. 4 is a horizontal sectional view taken substantially on the line 4—4 of Fig. 3.

Fig. 5 is a vertical sectional view of a piston or other partition embodying a modified form of liquid metering valve.

Fig. 6 is a top plan view of the same, and

Figs. 7 and 8 are views similar to Fig. 5, showing further modifications.

In Fig. 1 I have illustrated a relatively long strut, comprising an upper outer cylinder 10 closed at its upper end by a cap 11 which is provided with a bracket 12 by means of which the strut may be attached to some element carried by the fuselage or wing structure of the airplane.

At an intermediate point in the length of the cylinder, its diameter is reduced somewhat, and at this point a shoulder 13 is formed. Just above this shoulder a partition 14 is threadably mounted in the cylinder. The wall of the cylinder below the shoulder is thickened.

The lower end of the cylinder 10 is enlarged to form an annular pocket 15, within which is mounted a packing 16 of a character such that it will expand laterally when subjected to pressure axially of the strut. For a more particular description of this packing, reference may be had of my Patent No. 1,888,578 issued November 22, 1932. At the inner end this packing is engaged by a metal ring 17 which is free to move in pocket 15, while at its outer end it is engaged by a gland ring 18 threaded into the end of the cylinder. Around the lower enlarged part of the cylinder I mount a clamping band 19 upon which are formed perforated ears 20, 21 and 22 for attachment to rigid struts or tie rods by means of which the cylinder may be held in the desired position.

Within the outer cylinder 10 there is slidably mounted a lower inner cylinder 23. At its lower extremity the latter cylinder may carry a wheel spindle 24 upon which a ground wheel (not shown) may be mounted. Preferably the axis of spindle 24 forms an angle with the axis of cylinder 23 slightly greater than 90°. By this means I am enabled to incline the lower part of the ground wheel inwardly while maintaining the cylinders 10 and 23 practically vertical, and, if desired, the wheel tire may be caused to engage the ground substantially in line with the common axis of the two cylinders.

At its upper end the side walls of the cylinder 23 are thickened to form a head 25, into which is threaded a partition 26 constituting a piston. The outer surface of head 25 is machined to form splines 27, and the inner surface of cylinder 10 from the shoulder 13 down to the pocket 15 is formed with splines 28, the splines of one cylinder interfitting with those of the other cylinder.

Below the head 25, the outer surface of cylinder 23 is smooth, and it is this smooth surface which is engaged by packing 16. When the cylinders are extended as far as possible, the head 25 engages the ring 17 and presses the packing against the gland ring 18, thereby expanding it laterally and providing a highly effective seal. When the head 25 is not in contact with the ring 17, however, this pressure is relieved somewhat, and the friction against the cylinder 23 is lessened, so that the relative movement of the two cylinders may take place freely. More or less liquid may leak past the head 25 along the interengaging splined surfaces and collect between the head and the ring 17 in the spaces between the splines 28, and upon a sudden movement of expansion in the strut, pressure is applied through this liquid against ring 17 so that the packing 16 is again expanded laterally, applying added friction to the cylinder 23 and thereby assisting in checking the rebound stroke.

The partition 14 is provided with a plurality of holes 29 of small size, through which liquid is metered as the piston 26 moves up and down with respect to the partition. Under some conditions, these holes do not provide sufficient relief for the pressure set up under the partition. For such occasions I provide a larger opening 30 formed centrally in the partition 14 and normally covered by a valve plate 31 which is held to its seat resiliently by coil springs 32 surrounding headed posts 33 set into the partition 14 and held in place by a riveting operation. Obviously, when the pressure exerted upon plate 31 through opening 30 becomes great enough, the springs 32 will yield and the plate will rise, permitting a relatively rapid flow of liquid upwardly through the partition. This may continue for a very brief interval only or for a longer interval, depending upon the amount of pressure, and the opening and closing of the port 30 may occur more than once during a given upward travel of piston 26. Substantially this same type of partition and automatic valve is illustrated and described in my prior Patent No. 1,888,578 above mentioned.

As indicated in Fig. 1, the strut carries oil or other liquid in the space between piston 26 and partition 14 and above the latter partition, the approximate level of oil when the strut is supporting its share of the weight of an airplane being illustrated in that figure. Above the oil level there is air under pressure, which tends to expand the strut and upon which the weight of the airplane is supported. A combined filler plug and air valve 34 serves as a means for admitting oil and for air hose connections during the inflation of the strut.

Fig. 2 shows a modification of the construction of Fig. 1, in which there is a piston 26a having a central threaded opening in which is mounted a tapered metering pin 35 that projects upwardly through a central opening 36 in a partition 14A, similar in construction, location, and function to partition 14. There are no openings through the partition 14A except the central opening 36. A tube 37, closed at its upper end, surrounds metering pin 35, and at its lower and is provided with a flange 38 which normally engages the upper surface of the partition, against which it is resiliently held by coil springs 39 surrounding headed posts 40, these latter parts being similar in construction and function to the springs 32 and posts 33 of Fig. 1. In the side walls of tube 37 there are small holes 41 which have a function similar to that of holes 29 in Fig. 1, that is to say, they accommodate the flow of liquid through the partition under relatively light impact loads, and all flow under the rebound stroke. When the impact is heavy and sudden, as it will be generally during landing, the air above the liquid in the tube 37 will be compressed sufficiently to lift the tube 37 against the action of the springs 39, and liquid will flow outwardly between the partition 14A and the flange 38 into the space above the partition and outside the tube 37.

The metering pin 35 functions in the usual manner of a metering pin, that is to say, it progressively changes the effective size of the opening 36 as the piston 26a approaches or recedes from the partition. The tube 37, with its flange 38, takes the place of the plate 31 in Fig. 1, that is, it provides an automatic valve which may be employed where a metering pin is also employed.

The resulting action is somewhat different from that of Fig. 1, however, because the tube is lifted by air pressure instead of by pressure transmitted exclusively through an incompressible fluid. The lifting of the tube 37 is therefore somewhat delayed as compared with the lifting of the plate 31 in Fig. 1, that is, a greater movement of piston 26a must occur before the valve lifts than in the case of piston 26, and the closing of the automatic valve in Fig. 2 will be a little more prompt than in Fig. 1, because the springs 39 are assisted by the compressed air in the upper end of tube 37.

In Fig. 3 I have shown certain features of my invention applied to an airplane strut of a somewhat different type, that is, one in which the usual arrangement of the cylinders is inverted, the outer cylinder being the lower cylinder and the inner cylinder being the upper cylinder. It is a desirable arrangement where the length of the strut must be restricted on account of the design of the airplane upon which the strut is to be used.

This construction includes an outer lower cylinder 42 and an inner upper cylinder 43. The outer end of the lower cylinder is closed by a cap 44 which is threaded into the end of the cylinder and carries a pair of ring brackets 45 to which is fastened a wheel spindle 46. The inner cylinder 43 has a cap 47 at its outer end which may be welded to the cylinder and carries a bracket 48 for attachment to the airplane.

The outer cylinder is formed with an enlargement at its inner end, in which there is a pocket 49 for a packing 50, with a metal ring 51 and a gland ring 52 precisely the same as the corresponding parts in Fig. 1. This packing bears against the smooth outer surface of the cylinder 43. At the lower end of the latter cylinder, however, there is a head 25', in the outer surface of which are cut splines 27' similar to the splines 27 of Fig. 1, the splines 27' being interfitted with splines 28' formed on the inner surface of cylinder 42 and extending from the pocket 49 to the cap 44. These interengaging splines prevent swivelling, as in the case of Fig. 1.

Inasmuch as there is no partition in the outer cylinder of this construction, the automatic valve is mounted on a partition which constitutes a piston 14B. The valve itself might be like either one of the valves shown in Figs. 1 and 2, but I have illustrated in this connection a different form of valve wherein a metering pin of a different style may be utilized. The piston is provided with continuously open holes 53 of small size and a central opening 54 of larger size. Around this central opening there is an upwardly extending annular flange 55 upon which is threaded a small cylinder 56 which is closed at its upper end except for a central port 57, and is provided with a plurality of ports 58 in its side walls directly above the flange 55. The port 57 is normally closed by a spring controlled valve plate 59, in which there is a small central opening 60. Within the cylinder 56 there is a piston 61 which is closely fitted to the cylinder, and carries centrally a depending tapered metering pin 62. The operation of this form of valve is somewhat different from that of either of the forms heretofore described. When the strut is at rest, the piston 61 is in its lowermost position, closing off ports 58. When a small shock is encountered, liquid flows through the holes 53 and the piston 61 may rise slightly to permit some flow through opening 54 and the partially open ports 58. On the rebound, liquid enters the space within cylinder 56 through port 57, the plate 59 being unseated. The piston 61 is thereby forced down to its lowermost position, and the metering of liquid must take place exclusively through the holes 53, thereby checking the rebound.

When the strut receives a heavy impact, the liquid pressure beneath the piston 61 and against the lower end of pin 62 expels the liquid above the piston through the small hole 60 as rapidly as the small size of that hole will permit, thereby uncovering more or less of the ports 58 in order that flow through the piston may take place at a faster rate and in order that some of the impact may be absorbed by the highly resilient air in the upper end of the strut. When the impact is particularly heavy, the piston 61 may rise high enough in the cylinder 56 to bring the larger lower end of pin 62 into the opening 54, thereby retarding the flow.

It will be appreciated that this valve may be employed with or without the metering pin. Its action is hydraulically controlled, as distinct from the valves previously described where the action is either spring-controlled or controlled by springs in conjunction with compressed air.

Its operation may be varied by changes in the size of the hole 60, as well as by changes in the size or number of holes 53.

In Figs. 5 to 8 inclusive, I have shown three other forms of valves which may be substituted for the valve 14 of Fig. 1 or the valve 14B of Fig. 3.

In Figs. 5 and 6, the part 14C, which may constitute either the head of a piston or a partition like that shown at 14 in Fig. 1, has a central opening 63. Supported upon the part 14C concentrically with the opening 62, there is an open ended cylinder 64 with a horizontal flange at its lower end that is anchored to part 14C by bolts 65 or the like. Near its lower end the cylinder 64 is provided with a plurality of small openings 66. It is also provided with a pair of diametrically opposite longitudinally extending slots 67. The outer cylinder 68, with an upper closed end, is telescoped upon cylinder 64 and carries a pin 69 which extends through the slots 67. Pressure within the strut above the part 14C acts upon the closed end of cylinder 68 and tends to hold it down, that is, in the position illustrated in Fig. 5. Upon the occurrence of a shock and the building up of pressure beneath the part 14C and within the cylinder 64, 68 too great to be relieved by the flow of liquid through the small holes 66, the cylinder 68 rises, exposing more or less of the slots 67 through which liquid flow takes place. This valve is also controlled exclusively by fluid pressure in the strut.

In Fig. 7, the plate 14D has no opening therethrough except the central conical opening 70. To the plate around this opening there is secured by any suitable means a sleeve or cylinder 71 having side ports 72. Within this sleeve there is a conical valve piece 73 on the lower end of a stem 74, the valve piece and stem being drilled axially to form a central continuously open passage 75. A coil spring 76 surrounds the stem 74 and presses at its lower end against the valve piece 73 and at its upper end against a collar 77 which is threaded into the sleeve and has a smooth bore by means of which the stem 74 is guided. The tension of the spring may be varied by adjustment of the collar 77. This valve functions somewhat like that shown in Fig. 1, but it may be noted that when the valve piece 73 is lifted off its seat, the effective area exposed to pressure is increased, and the closing of the valve is delayed somewhat. Variations in operations are accomplished by the adjustment of the collar 77.

The form of valve illustrated in Fig. 8 is quite similar to that of Fig. 3. The plate 14E is provided with small openings 78 like the openings 53 of Fig. 3. It also has an annular flange 79 on which is threaded a cylinder 80 in which slides a piston 81 supporting a metering pin 82 which extends through a central opening 83 in the plate 14E.

The cylinder has side ports 84 and an end port 85. The operation of this device is quite similar to that of Fig. 3. On the rebound, liquid can enter the space within the cylinder 80 above the piston 81 somewhat more slowly than through port 57 with the valve plate 59 unseated. On the impact stroke, the piston 81 rises at a rate of speed more or less in proportion to the force of the impact, except that the size of the stream flowing through the port 85 is affected by the speed of flow, in accordance with a well known law of hydraulics, that is to say, if the speed of flow is moderate, the quantity of liquid passing through the orifice at any given instant is greater than it is when the speed is considerably increased.

Variations from the described structures may be employed. Accordingly, I desire it to be understood that the scope of the invention is to be regarded as defined exclusively by the appended claims rather than by the foregoing description or the accompanying illustrations.

Having thus described my invention, I claim:

1. In a shock absorbing strut, two telescoping members adapted to be interposed between the parts whose relative movements are to be cushioned, a partition fixed with respect to one of said members, said partition having an opening therethrough, an upwardly extending tube yieldably secured to said partition around said opening, said tube being closed at its upper end, said strut having liquid therein extending partway up the length of the tube, whereby pressure exerted suddenly tending to compress the strut compresses the air in the tube and lifts the latter off its seat on said partition.

2. In a shock absorbing strut, two telescoping members adapted to be interposed between the parts whose relative movements are to be cushioned, a partition fixed with respect to one of said members, said partition having an opening therethrough, an upwardly extending tube yieldably secured to said partition around said opening, said tube being closed at its upper end and having a metering opening in its side wall, said strut having liquid therein extending partway up the length of the tube, whereby pressure exerted suddenly tending to compress the strut compresses the air in the tube and lifts the latter off its seat on said partition.

3. In a shock absorbing strut, two telescoping members adapted to be interposed between the parts whose relative movements are to be cushioned, a partition fixed with respect to one of said members, said partition having an opening therethrough, an upwardly extending tube mounted upon said partition surrounding said opening, means for attaching the tube to the partition permitting relative movement, said tube being closed at its upper end, said strut having liquid therein extending into the tube, whereby pressure exerted suddenly tending to compress the strut lifts the tube, said lifting of the tube exposing a further passage for liquid.

4. In a shock absorbing strut, two telescoping members adapted to be interposed between the parts whose relative movements are to be cushioned, a partition fixed with respect to one of said members, said partition having an opening therethrough, upwardly extending tubular means mounted upon said partition surrounding said opening, said tubular means having a restricted passage therethrough and being closed at its upper end, said strut having liquid therein extending into said tubular means, said tubular means being adapted to provide an additional liquid passage when the strut is suddenly compressed increasing the pressure on the inside of the tube.

5. In a shock absorbing strut, two telescoping members adapted to be interposed between the parts whose relative movements are to be cushioned, a partition fixed with respect to one of said members, said partition having an opening therethrough, an upwardly extending tube mounted upon said partition surrounding said opening, means for attaching the tube to the partition permitting relative movement, said tube being closed at its upper end, said strut having liquid therein extending into the tube, whereby pressure exerted suddenly tending to compress the strut lifts the tube, said lifting of the tube exposing a further passage for liquid, and a metering pin carried by the other of said telescoping members and extending into the tube through the opening of the partition.

JOHN F. WALLACE.